United States Patent
Faghidi et al.

(10) Patent No.: US 12,085,108 B2
(45) Date of Patent: Sep. 10, 2024

(54) WALLBOARD ANCHOR

(71) Applicant: THE HILLMAN GROUP, INC., Cincinnati, OH (US)

(72) Inventors: Hamid Faghidi, Ontario (CA); Nalinikanth Garikapati, Phoenix, AZ (US); Michael Martin Hicks, Gilbert, AZ (US)

(73) Assignee: THE HILLMAN GROUP, INC., Forest Park, OH (US)

( * ) Notice: Subject to any disclaimer, the term of this patent is extended or adjusted under 35 U.S.C. 154(b) by 1233 days.

(21) Appl. No.: 16/694,215

(22) Filed: Nov. 25, 2019

(65) Prior Publication Data
US 2020/0173482 A1 Jun. 4, 2020

Related U.S. Application Data
(60) Provisional application No. 62/772,951, filed on Nov. 29, 2018.

(51) Int. Cl.
| | | |
|---|---|---|
| *F16B 13/12* | (2006.01) | |
| *E04B 1/74* | (2006.01) | |
| *F16B 13/04* | (2006.01) | |
| *F16B 13/06* | (2006.01) | |
| *F16B 29/00* | (2006.01) | |
| *F16B 13/00* | (2006.01) | |

(52) U.S. Cl.
CPC ............ *F16B 29/00* (2013.01); *E04B 1/74* (2013.01); *F16B 13/04* (2013.01); *F16B 13/063* (2013.01); *F16B 13/00* (2013.01)

(58) Field of Classification Search
CPC .... F16B 13/002; F16B 13/124; F16B 25/103; F16B 25/0084; F16B 13/003; F16B 25/0078
USPC .............. 411/29–31, 80.1, 80.5, 80.6, 387.1
See application file for complete search history.

(56) References Cited

U.S. PATENT DOCUMENTS

| | | | |
|---|---|---|---|
| 120,577 A | 11/1871 | Farrel | |
| 438,754 A | 10/1890 | Rogers | |
| 1,084,643 A | 1/1914 | Lasater | |
| 2,169,408 A | 8/1939 | De Vellier | |
| 3,045,523 A | 7/1962 | Reed | |
| 4,028,987 A * | 6/1977 | Wilson | F16B 25/10 411/416 |
| 4,034,641 A * | 7/1977 | Williams, Jr. | F16B 25/0031 411/387.7 |
| 4,142,440 A * | 3/1979 | Schefer | F16B 13/124 411/42 |
| 4,257,307 A * | 3/1981 | Regensburger | F16B 25/0094 408/231 |

(Continued)

FOREIGN PATENT DOCUMENTS
CA  2205901  5/1996

*Primary Examiner* — Flemming Saether
(74) *Attorney, Agent, or Firm* — THOMPSON HINE LLP

(57) ABSTRACT

An anchor for wallboard installation includes an elongated anchor body including a driving end and a wall boring end. The anchor body has a main body portion running from the driving end toward the wall boring end. The wall boring end includes a plurality of axially cutting extending teeth. The anchor body includes an internal bore and diametrically opposed slots to facilitate split of an end portion of the anchor body when the anchor is installed in a wall and a fastener is inserted for mounting an object.

19 Claims, 11 Drawing Sheets

(56) References Cited

U.S. PATENT DOCUMENTS

| | | | |
|---|---|---|---|
| 4,601,625 A | 7/1986 | Ernst | |
| 4,763,456 A | 8/1988 | Giannuzzi | |
| 4,892,429 A | 1/1990 | Giannuzzi | |
| 4,907,928 A * | 3/1990 | Beck | F16B 35/04 411/441 |
| 5,039,262 A | 8/1991 | Giannuzzi | |
| 5,160,225 A | 11/1992 | Chern | |
| 5,190,425 A * | 3/1993 | Wieder | F16B 13/002 411/29 |
| 5,234,299 A | 8/1993 | Giannuzzi | |
| 5,259,398 A | 11/1993 | Vrespa | |
| 5,267,423 A | 12/1993 | Giannuzzi | |
| 5,308,203 A | 5/1994 | McSherry | |
| 5,382,195 A * | 1/1995 | Hiler | F16B 25/103 409/211 |
| 5,413,444 A | 5/1995 | Thomas | |
| 5,449,257 A | 9/1995 | Giannuzzi | |
| 5,482,418 A | 1/1996 | Giannuzzi | |
| 5,529,449 A | 6/1996 | McSherry | |
| 5,536,121 A | 7/1996 | McSherry | |
| 5,558,479 A | 9/1996 | McElderry | |
| 5,625,994 A | 5/1997 | Giannuzzi | |
| 5,630,688 A | 5/1997 | Tran | |
| 5,692,864 A | 12/1997 | Powell | |
| 5,749,689 A * | 5/1998 | Konig | F16B 25/0094 411/29 |
| 5,752,792 A | 5/1998 | McSherry | |
| 5,833,415 A | 11/1998 | McSherry | |
| 5,944,295 A | 8/1999 | McSherry | |
| 6,004,085 A * | 12/1999 | Yamamoto | F16B 13/126 411/60.1 |
| 6,042,314 A | 3/2000 | Guelck | |
| 6,079,921 A | 6/2000 | Gauthier | |
| 6,139,236 A | 10/2000 | Ito | |
| 6,186,716 B1 | 2/2001 | West | |
| 6,196,780 B1 | 3/2001 | Wakai | |
| 6,306,140 B1 | 10/2001 | Siddiqui | |
| 6,354,779 B1 | 3/2002 | West | |
| 6,382,892 B1 | 5/2002 | Hempfling | |
| 6,435,789 B2 * | 8/2002 | Gaudron | F16B 13/002 411/29 |
| D462,895 S | 9/2002 | Gaudron | |
| 6,679,661 B2 | 1/2004 | Huang | |
| 6,882,892 B2 | 4/2005 | Farrah | |
| 6,896,460 B2 | 5/2005 | Enonnoto | |
| 6,896,462 B2 | 5/2005 | Stevenson | |
| 7,001,124 B2 | 2/2006 | Panasik | |
| 7,143,497 B2 | 12/2006 | Panasik | |
| 7,144,212 B2 | 12/2006 | Kaye | |
| 7,261,505 B2 | 8/2007 | Ernst | |
| 7,266,874 B2 | 9/2007 | Ernst | |
| 7,290,972 B2 | 11/2007 | Gauthier | |
| 7,320,569 B2 | 1/2008 | Kaye | |
| 7,517,182 B2 | 4/2009 | Cabrele | |
| D593,141 S | 5/2009 | Gaudron | |
| 7,611,316 B2 * | 11/2009 | Panasik | F16B 13/0808 411/340 |
| D605,933 S | 12/2009 | Gaudron | |
| 7,654,781 B2 | 2/2010 | McDuff | |
| 7,686,556 B2 | 3/2010 | Belinda | |
| 7,762,751 B2 | 7/2010 | Panasik | |
| 7,815,407 B2 | 10/2010 | Kucharyson | |
| 7,883,307 B2 | 2/2011 | Pippard | |
| 7,934,895 B2 | 5/2011 | Ernst | |
| D642,900 S | 8/2011 | McDuff | |
| 8,057,147 B2 | 11/2011 | Ernst | |
| 8,066,461 B2 | 11/2011 | Travers | |
| 8,192,123 B2 | 6/2012 | Ernst | |
| 8,303,224 B2 | 11/2012 | McDuff | |
| RE44,016 E | 2/2013 | Remmer | |
| 8,376,679 B2 | 2/2013 | Gaudron | |
| 8,449,236 B2 | 5/2013 | McDuff | |
| 8,764,364 B2 | 1/2014 | Brown | |
| 8,740,527 B2 | 6/2014 | Cheng | |
| 8,864,431 B2 * | 10/2014 | Su | F16B 25/0063 411/387.1 |
| 9,133,630 B2 | 9/2015 | Dougherty | |
| 9,353,782 B2 | 5/2016 | McDuff | |
| 9,857,662 B2 | 1/2018 | Kato | |
| 9,885,378 B2 | 2/2018 | DeClark | |
| 2003/0138306 A1 * | 7/2003 | Wallace | F16B 13/002 411/29 |
| 2004/0052606 A1 | 3/2004 | Kerl | |
| 2005/0084360 A1 | 4/2005 | Panasik | |
| 2005/0214095 A1 | 9/2005 | Brown | |
| 2006/0018730 A1 | 1/2006 | Ernst | |
| 2006/0127199 A1 | 6/2006 | Bappert | |
| 2006/0165506 A1 | 7/2006 | Panasik | |
| 2014/0010618 A1 * | 1/2014 | Sheu | F16B 25/0015 411/387.2 |
| 2014/0178148 A1 * | 6/2014 | Huang | F16B 25/103 411/387.1 |
| 2016/0102696 A1 | 4/2016 | DeClark | |
| 2017/0051772 A1 | 2/2017 | McDuff | |
| 2017/0089380 A1 | 3/2017 | McDuff | |
| 2021/0040971 A1 * | 2/2021 | Pirozzi | F16B 13/124 |

* cited by examiner

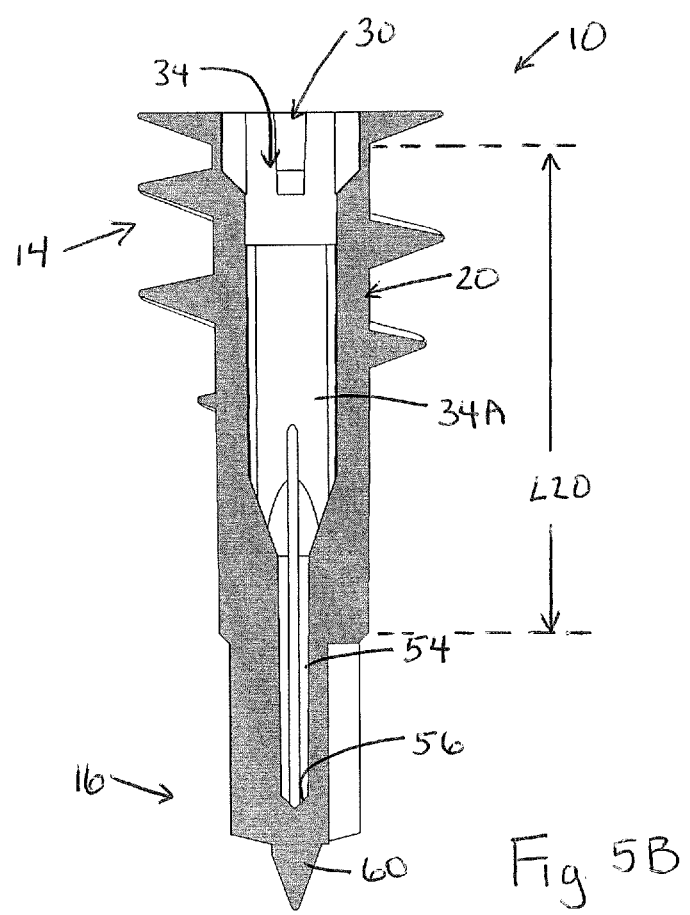

WALLBOARD ANCHOR

TECHNICAL FIELD

This application relates generally to wall anchors for drywall and other types of wallboard, and more particularly, to a wallboard penetrating anchor.

BACKGROUND

A variety of types of wall anchors are known, including anchors that can be rotated into wallboard without pre-drilling a hole in the wallboard. Improvements in both the manufacturability and performance of such anchors is continually sought.

SUMMARY

In one aspect, an anchor for wallboard installation includes an elongated anchor body including a driving end and a wall boring end. The anchor body has a main body portion running from the driving end toward the wall boring end. A wall seating flange extends radially outward from a rearward end of the main body portion, wherein the main body portion includes a thread that runs from an intermediate location along a length of the main body portion and toward the wall seating flange. The wall boring end includes a plurality of axially cutting extending teeth, wherein each cutting tooth includes a forward cutting edge and a radial cutting edge. For each cutting tooth, the radial cutting edge is defined by an intersection of a substantially planar first wall segment of the cutting tooth and a substantially planar second wall segment of the cutting tooth. The elongated anchor body includes a central axis. For each cutting tooth, the substantially planar first wall segment runs substantially parallel to but offset from the central axis, and the substantially planar second wall segment extends radially inwardly to define, in an axial end view, an enclosed acute angle. The elongated anchor body includes a distal positioning tip at the wall boring end. For each cutting tooth, the forward cutting edge extends radially outward from and rearward from the distal positioning tip and axially toward the driving end such that an angle enclosed by each forward cutting edge and the central axis is less than ninety degrees and more than sixty degrees. A pair of diametrically opposed recesses are formed in the main body portion, wherein a pair of diametrically opposed slots are provided in the anchor body, wherein each slot includes a first end that begins in one of the recesses, wherein each slot extends toward the distal positioning tip of the wall boring end.

In another aspect, an anchor for wallboard installation includes an elongated anchor body including a driving end and a wall boring end. The anchor body has a main body portion running from the driving end toward the wall boring end. The wall boring end includes a plurality of axially cutting extending teeth.

In yet another aspect, an anchor for wallboard installation includes an elongated anchor body including a driving end and a wall boring end. The anchor body has a main body portion running from the driving end toward the wall boring end. A wall seating flange extends radially outward from a rearward end of the main body portion, wherein the main body portion includes a thread that runs from an intermediate location along a length of the main body portion and toward the wall seating flange. The wall boring end includes a plurality of cutting teeth. A pair of diametrically opposed recesses are formed in the main body portion, wherein a pair of diametrically opposed slots are provided in the anchor body, wherein each slot includes a first end that begins in one of the recesses, wherein each slot extends toward a distal tip of the wall boring end. The anchor body includes an internal bore running from the driving end toward a distal tip of the wall boring end, wherein the internal bore terminates short of the distal tip. Each slot is a through slot to the internal bore, wherein each slot runs from the first end for an axial length and terminates short of the distal positioning tip, wherein each recess has a curved perimeter shape for stress relief. The internal bore includes a first bore section running from the driving end toward the distal tip and a second bore section running from the first bore section toward the distal tip. The second bore section has a smaller size in axial end view than the first bore section, such that a fastener threaded into the bore causes and end section of the anchor body to split when the fastener pushes radially outwardly on inner wall portions of the second bore section.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 5B and 6 show cross-sections of the anchor, with wall portions that are section shaded;

DETAILED DESCRIPTION

Figure 1:
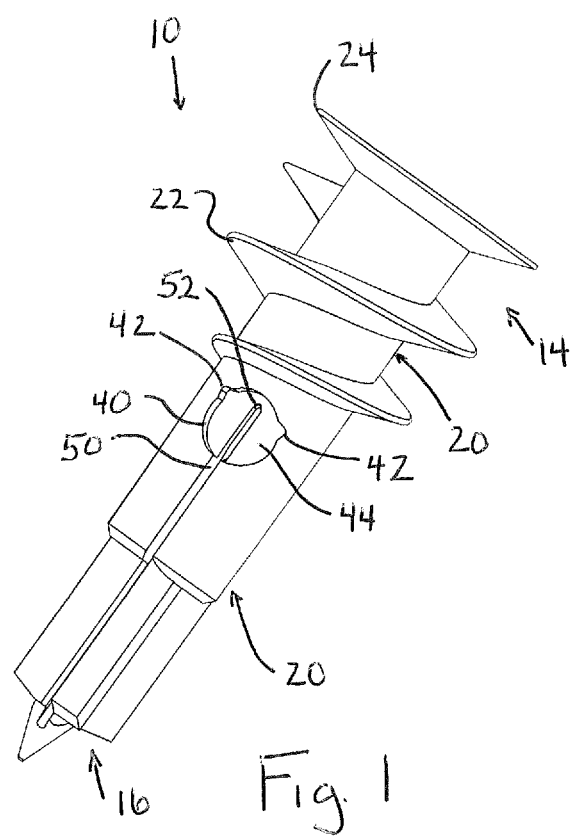
FIGS. 1 and 2 show perspective views of one embodiment of an anchor.
Figure 2:
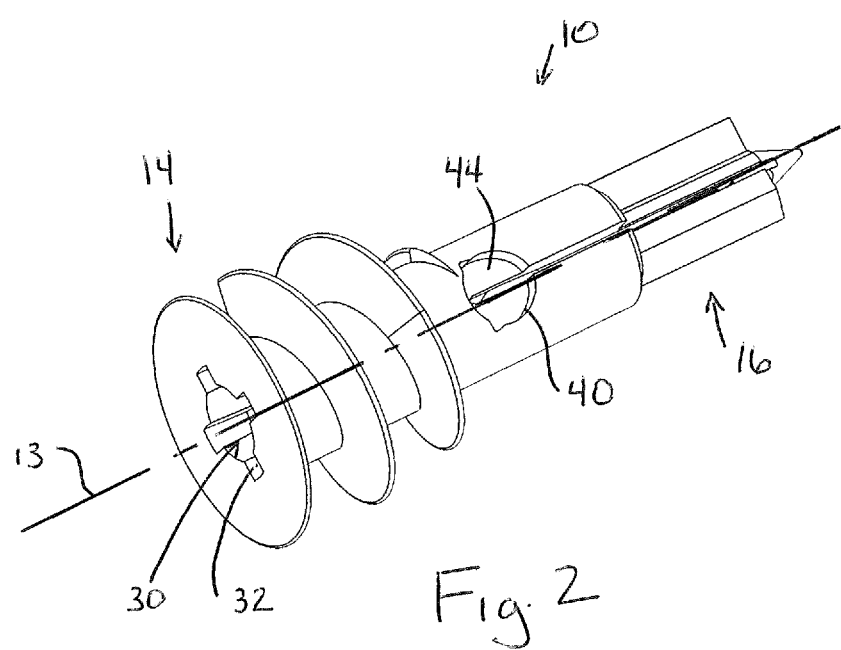
Figure 3:
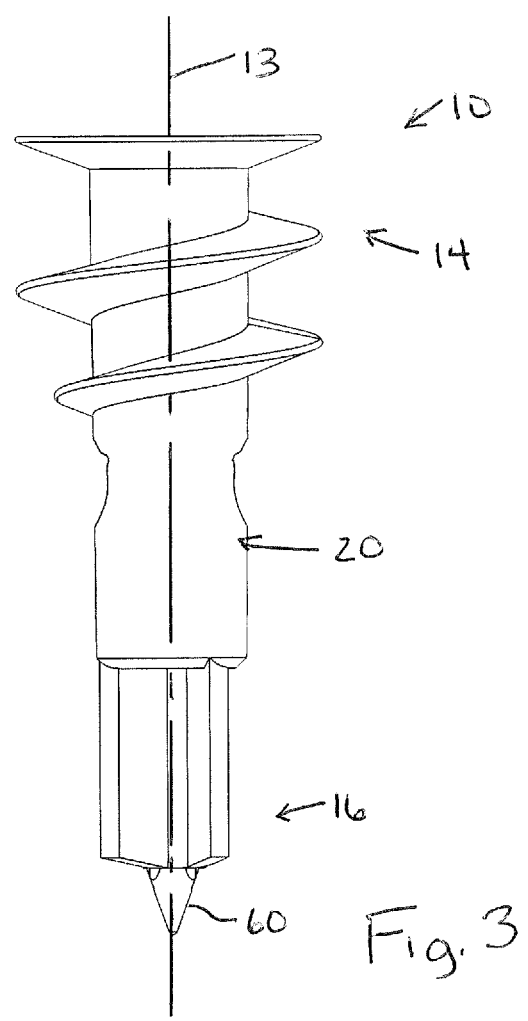
FIGS. 3, 4 and 5A show side elevations of the anchor.
Figure 4:
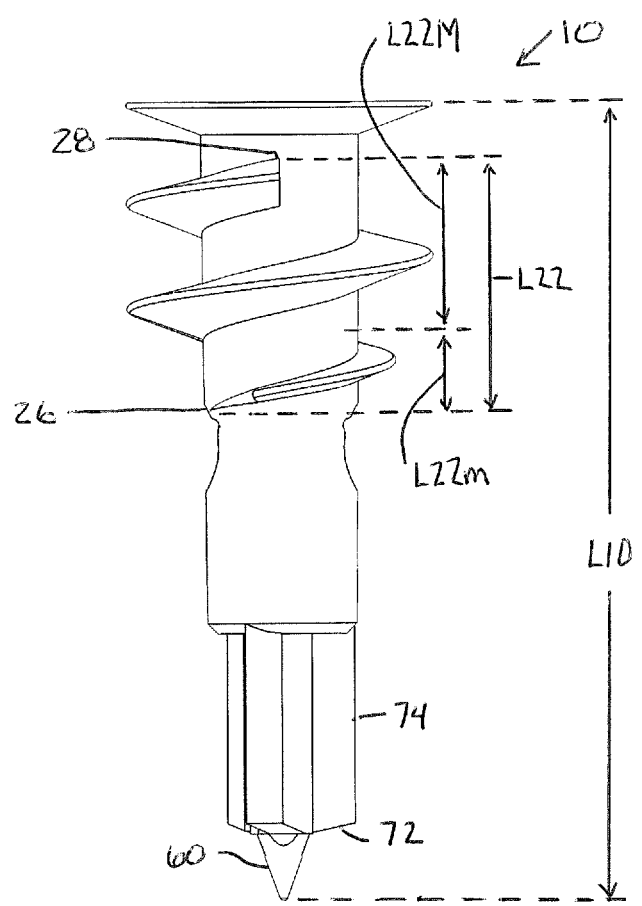
Figure 5A:
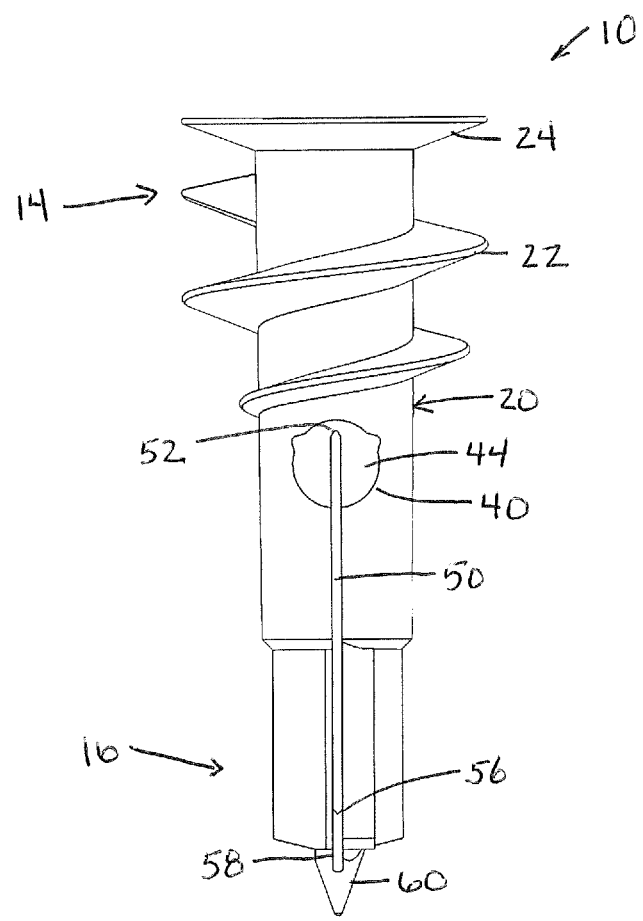
Figure 6:
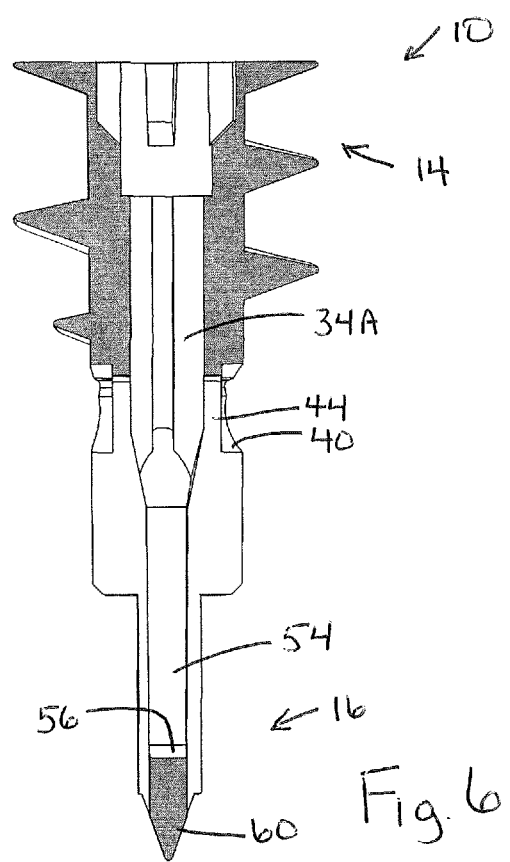
Figure 7:
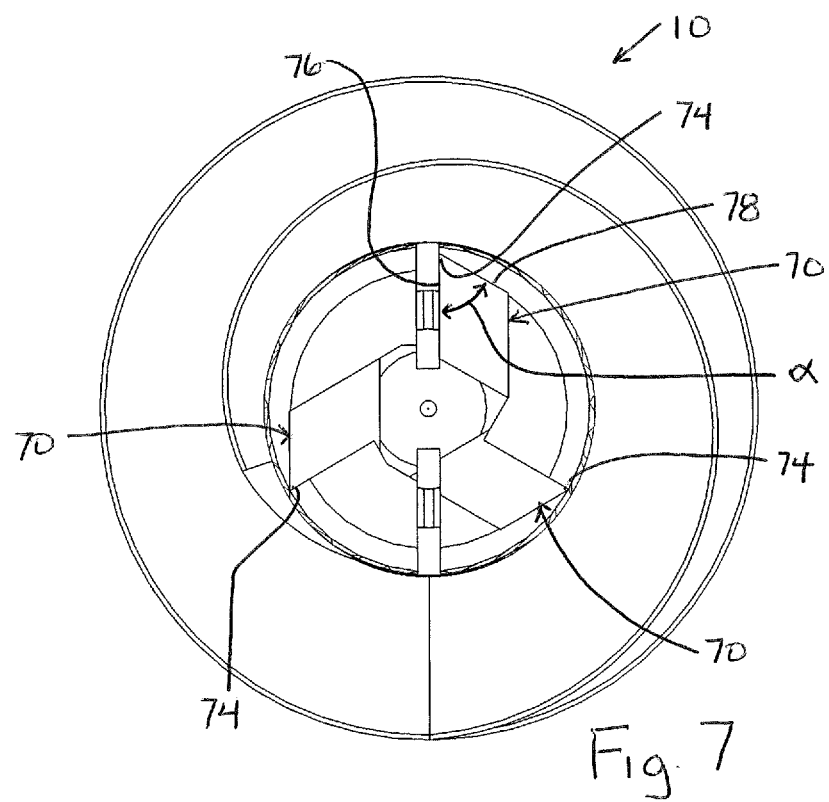
FIG. 7 shows an axial end view of the anchor.
Figure 8:
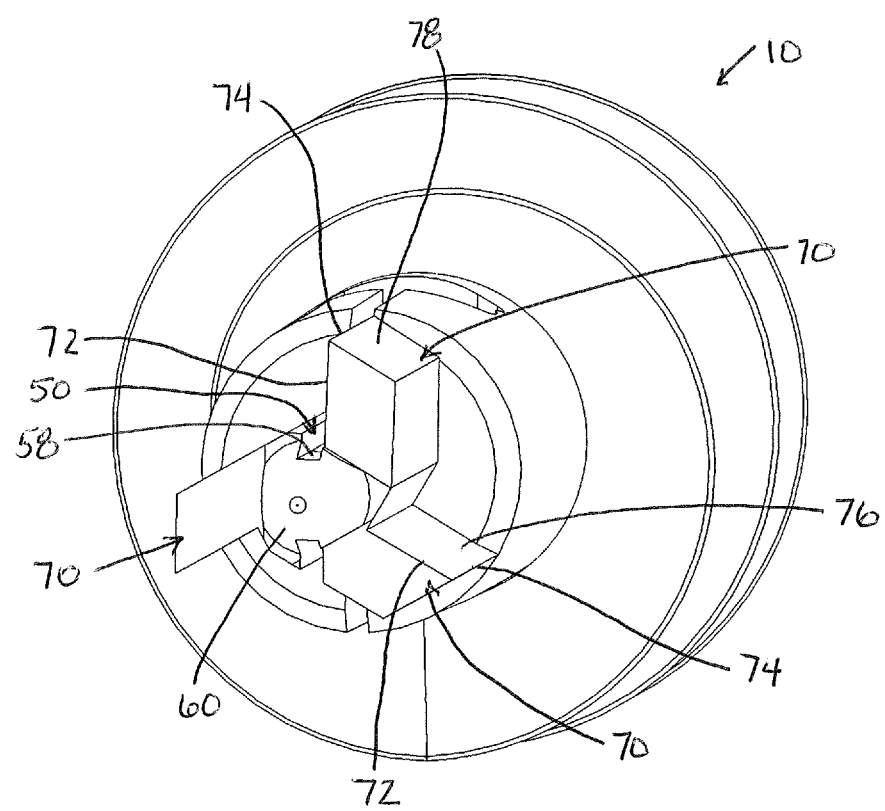
FIG. 8 shows a perspective end view of the anchor.
Figure 9:
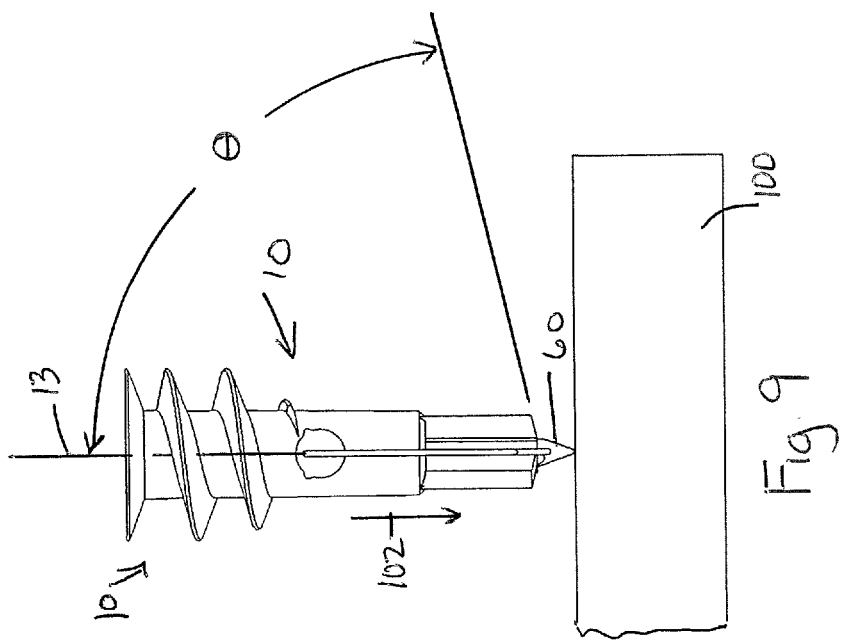
FIGS. 9-14 show an anchor install sequence.
Figure 10:
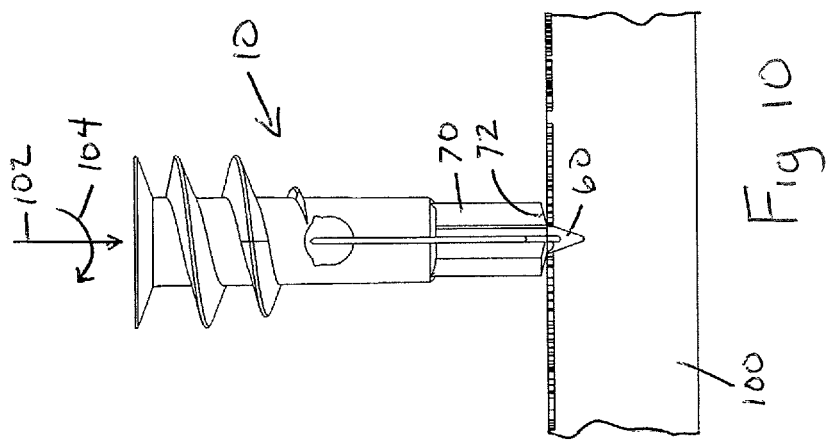
Figure 11:
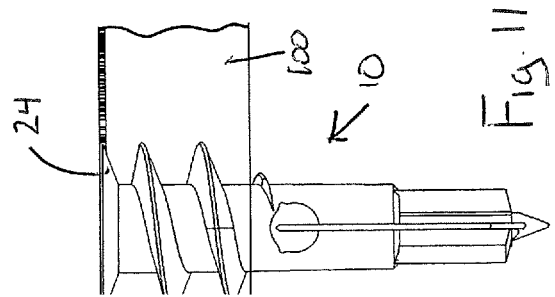

In the drawings and description of various anchor embodiments below, the term wallboard is generally used to refer to the most common wallboard such as drywall, but it is recognized that the anchor components could be suitable for any other friable wallboard material, such as dense corks or foams or other materials that can crumble. Accordingly, the term wallboard as used herein is intended to broadly encompass, for example, both typical drywall (aka plasterboard and gypsum board) and such other friable wallboard materials.

Referring to FIGS. 1-14, in one embodiment, an anchor 10 includes an elongated anchor body 12 with a lengthwise axis 13, and has a rearward driving end 14 and a forward or distal wall boring end 16. The anchor body may, for example, be formed of a molded plastic material. The driving end 14 of the body 12 includes a substantially cylindrical main body portion 20 with a high thread 22 formed thereon. The high thread 22 will operate to engage with wallboard material to help retain the anchor body to a wall when installed. The high thread runs helically with a constant pitch and may have an axial length L22 that is between about 25% and about 45% of the full anchor length L10. The diameter of the main body portion 20 may, for example, be between about 0.25 inches and about 0.35 inches. A major portion of the thread along an axial length L22M includes a substantially constant thread height and a minor portion of the thread along an axial length L22m has a thread height that continuously reduces. The length L22M may be more than 1.5 times the length L22m.

A flange 24 extends outward from the front rear end of main body portion 20 and will engage with the front surface of a wall to define the limit of penetration of the anchor. The underside of the flange 24 may be slightly tapered (e.g., slight frusto-conical shape) in order to push the outer surface of the wall inward slightly so that the face of the flange sits more flushly with the wall surface. The thread 22 begins at an axial location 26 along the body portion 20 and ends at a location 28 short of the flange 24. The end face of flange 24 defines an opening 30 into the cylindrical body 20 and includes an end portion defining a fastener driving recess 32 (e.g., a Phillips recess or some other configuration). Inward of the recess 32 an internal bore 34 of the cylindrical body 20 is provided for receiving a threaded fastener (e.g., a nut or bolt). An axial length L20 of the cylindrical body 20 may be between about 55% and about 75% of the anchor axial length L20 (such as between about 60% and about 70%).

It is recognized that the main body portion 20 need be completely cylindrical along its full length. For example, the portion of main body portion 20 toward the wall boring end, or the full length of the main body portion 20, could include a small taper to reduce in diameter toward the wall boring end. Alternatively, there could be a slight step down in the diameter of the main body portion 20 toward the wall boring end (e.g., in the vicinity of the recesses 40 described below). Whether the body is completely cylindrical, partially cylindrical, fully or partially tapered, or included a slight step down in diameter, the term substantially cylindrical as used herein is considered to be applicable to the main body portion so long as a diameter of the main body portion at its forward end (toward the wall boring end of the anchor) is no less than eighty percent of a diameter of the main body portion at its rear end (proximate the flange 24).

Diametrically opposed recessed sections 40 are provided on the outer surface of the main body portion 20 in order to provide wall portions 44 of reduced thickness, and thus reduced strength. The perimeter of each recess 40 is curved for stress relief and may include small ear projection sections 42 on sides of the recess and facing toward the driving end of the anchor body. Diametrically opposed slots 50 are provided, each of which includes one end 52 that begins in the wall portion 44 of the recess 40. The slots extend toward the wall boring end 14. The slots extend completely through the main body portion 20 and into the internal bore 34 with a larger bore section 34A and a smaller bore section 54 in the wall boring end 16 of the anchor. The bore section 54 terminates in an end wall portion 56, but the slot continues as a recessed groove 58 onto a positioning tip 60 of the wall boring end 16. Here, the positioning tip 60 has substantially conical configuration. The recessed grooves 58 provide a zone of weakening to facilitate breakage of the positioning tip 60 during anchor split as is described further below.

Between the positioning tip 60 and the main body portion a set of radially spaced apart and axially extending wallboard cutting teeth 70 are provided. In the illustrated embodiment, three teeth 70 are provided, but the number could vary. The anchor is configured to be driven into a wall by rotation in a clockwise direction as viewed axially from the driving end of the anchor. Each cutting tooth therefore includes a forward cutting edge 72 and a radial cutting edge 74. The forward cutting edge 72 extends radially outward and slightly rearward (i.e., away from the positioning tip 60 and axially toward the driving end 14). By way of example, an angle θ enclosed by each forward cutting edge 72 and the anchor axis 13 may be between about seventy degrees and about eighty-two degrees (such as between seventy-three degrees and seventy-nine degrees). The radial cutting edges 74 run substantially parallel to the anchor axis 13. The cutting edges 74 lie in a common circular cylinder shape or profile (not shown) that is centered on the anchor axis 13. The cutting edges 74 lie slightly radially inward of the outer surface of the main body portion 20. Each radial cutting edge 74 is defined by the intersection of a substantially planar wall segment 76 and a substantially planar wall segment 78. Each wall segment 76 may run substantially parallel to but offset from the central axis 13 of the anchor, and each wall segment 78 may extend radially inwardly, running in the direction away from its adjacent wall segment 76, to define, in an axial end view, an enclosed acute angle α. Angle α may, for example, be between about fifty degrees and about seventy degrees (such as between about fifty-five degrees and about sixty-five degrees).

FIGS. 9-14 depict an anchor install sequence, inclusive of fastener attachment to the anchor. The anchor 10 is initially placed with its positioning tip against the wall 100, per FIG. 9, and an axial force 102 is applied. The axial force moves the tip into the wall sufficiently to bring the forward cutting edges of the cutting teeth adjacent the wall, per FIG. 10. Rotational torque 104 is applied, along with continued axial force 102, to rotate the anchor entirely through the wall to achieve a set install position with flange 24 seated relatively flushly into the wall surface per FIG. 11. Notably, the cutting teeth 70 cut a primary bore into the wall, with the bore slightly smaller in diameter than the main body portion 20, but large enough to allow user forces to move the main body portion 20 into the bore. Continued application of rotational and axial force engages the thread 22 into the wall, with the thread 22 cutting a thread path into the wall. In this position, the high thread 22 engages with the wallboard material and provides relatively solid retention against axial pull-out.

Figure 12:
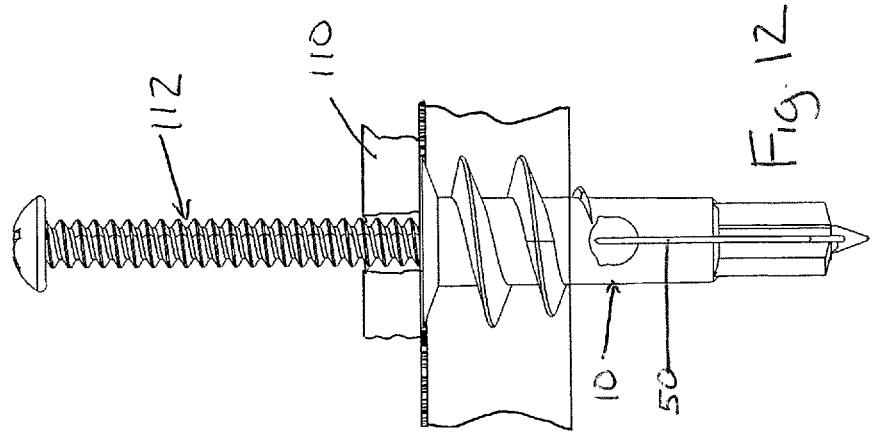
Figure 13:
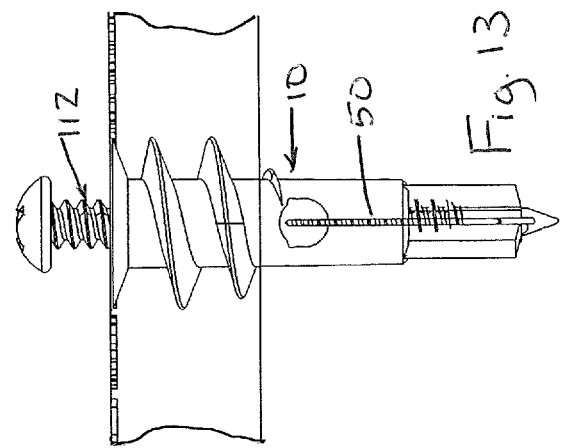
Figure 14:
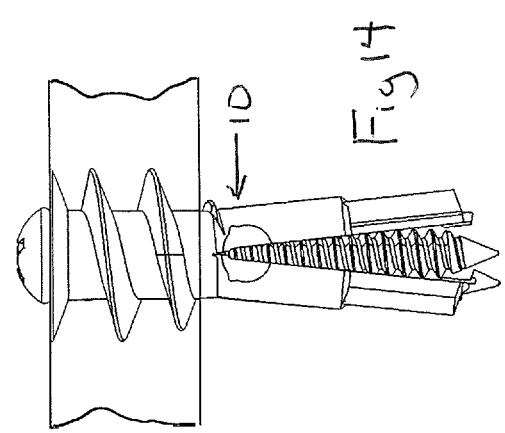

An object 110 can be mounted to the anchor and wall using a threaded fastener 112 per FIG. 12, where the fastener passes through a hole in the object 110 and then into the internal bore(s) of the anchor 10. The fastener threadedly engages with internal walls of the larger size bore 34 (see FIG. 5B). The fastener may be sized so that when the fastener reaches the smaller size bore 54 (see FIG. 5B), the force of the fastener against the lateral walls of the bore 54 causes an end segment of the anchor to split along the diametrically opposed slots 50 (e.g., before the distal end of the fastener reaches the end 56 of the bore 54). This split causes the portions of the anchor internal of the wall (e.g., from recesses to the positioning tip) to expand outwardly per FIG. 14, providing additional retention against wall pull out. Notably, in FIGS. 13 and 14 here, the object being hung is not shown. Typically, the fastener 112 will be long enough to cause anchor split before the fastener head tightly engages the object 110 and presses it against the wall.

It is to be clearly understood that the above description is intended by way of illustration and example only, is not intended to be taken by way of limitation, and that other changes and modifications are possible. Other configurations are also possible.

What is claimed is:

1. An anchor for wallboard installation, comprising:
   an elongated anchor body including a driving end and a wall boring end;
   wherein the anchor body has a main body portion running from the driving end toward the wall boring end;
   wherein the wall boring end includes a plurality of axially cutting extending teeth;
   wherein a pair of diametrically opposed recesses are formed in the main body portion to define wall portions of reduced thickness on the anchor body as compared to wall portions surrounding the recesses;
   wherein the anchor body includes an internal bore;

wherein a pair of diametrically opposed slots are provided in the anchor body, wherein each slot is a through slot to the internal bore, wherein each slot includes a first end located in one of the recesses.

2. The anchor of claim 1, wherein the elongated anchor body includes a distal positioning tip at the wall boring end, wherein the distal positioning tip is substantially conical, wherein each cutting tooth includes a forward cutting edge and a radial cutting edge, wherein the forward cutting edge is offset axially, in a direction toward the driving end, from the distal positioning tip.

3. The anchor of claim 2, wherein, for each cutting tooth, the radial cutting edge is defined by an intersection of a substantially planar first wall segment of the cutting tooth and a substantially planar second wall segment of the cutting tooth.

4. The anchor of claim 3, wherein the elongated anchor body includes a central axis, wherein, for each cutting tooth, the substantially planar first wall segment runs substantially parallel to but offset from the central axis, and the substantially planar second wall segment extends radially inwardly to define, in an axial end view, an enclosed acute angle.

5. The anchor of claim 2, wherein the elongated anchor body includes a central axis, wherein, for each cutting tooth, the forward cutting edge extends radially outward from and rearward from the distal positioning tip and axially toward the driving end such that an angle enclosed by each forward cutting edge and the central axis is less than ninety degrees and more than sixty degrees.

6. The anchor of claim 1, wherein the elongated anchor body includes a distal positioning tip at the wall boring end, wherein each slot extends beyond the one of the recesses toward the distal positioning tip.

7. The anchor of claim 1, wherein each slot runs from the first end for an axial length and terminates short of the distal positioning tip.

8. The anchor of claim 1, wherein each recess has a curved perimeter shape for stress relief.

9. The anchor of claim 8, wherein each curved perimeter shape includes a pair of ear projecting sections facing toward the driving end.

10. The anchor of claim 1, wherein the internal bore runs from the driving end toward a distal tip of the wall boring end, wherein the internal bore terminates short of the distal tip, wherein the internal bore includes a first bore section running from the driving end toward the distal tip and a second bore section running from the first bore section toward the distal tip, wherein the second bore section has a smaller size in axial end view than the first bore section, such that a fastener threaded into the bore causes and end section of the anchor body to split when the fastener pushes radially outwardly on inner wall portions of the second bore section.

11. The anchor of claim 1, wherein the main body portion is substantially cylindrical.

12. The anchor of claim 1, wherein a wall seating flange extends radially outward from a rearward end of the main body portion, wherein the main body portion includes a thread that runs from an intermediate location along a length of the main body portion and toward the wall seating flange.

13. The anchor of claim 12, wherein the anchor has a full anchor length, where the thread runs helically with a constant pitch, wherein an axial length of the thread is between twenty five percent and forty-five percent of the full anchor length.

14. The anchor body of claim 13, wherein the intermediate location is proximate one of the recesses.

15. The anchor body of claim 1, wherein each slot extends toward the distal positioning tip.

16. An anchor for wallboard installation, comprising:
an elongated anchor body including a driving end and a wall boring end;
wherein the anchor body has a main body portion running from the driving end toward the wall boring end;
wherein a wall seating flange extends radially outward from a rearward end of the main body portion, wherein the main body portion includes a thread that runs from an intermediate location along a length of the main body portion and toward the wall seating flange
wherein the wall boring end includes a plurality of axially extending teeth, wherein each cutting tooth includes a forward cutting edge and a radial cutting edge;
wherein, for each cutting tooth, the radial cutting edge is defined by an intersection of a substantially planar first wall segment of the cutting tooth and a substantially planar second wall segment of the cutting tooth;
wherein the elongated anchor body includes a central axis, wherein, for each cutting tooth, the substantially planar first wall segment runs substantially parallel to but offset from the central axis, and the substantially planar second wall segment extends radially inwardly to define, in an axial end view, an enclosed acute angle;
wherein the elongated anchor body includes a distal positioning tip at the wall boring end, wherein the distal positioning tip is substantially conical, wherein, for each cutting tooth, the forward cutting edge begins at a point axially offset, in a direction toward the driving end, from an end of the distal positioning tip and extends radially outward from and rearward from the distal positioning tip and axially toward the driving end such that an angle enclosed by each forward cutting edge and the central axis is less than ninety degrees and more than sixty degrees;
wherein a pair of diametrically opposed slots are provided in the anchor body, wherein each slot includes a first end that begins at an intermediate location along the anchor body and extends toward the distal positioning tip of the wall boring end;
wherein the anchor body includes an internal bore running from the driving end toward the distal positioning tip of the wall boring end, wherein the internal bore terminates short of the distal positioning tip, wherein each slot is a through slot to the internal bore, wherein each slot runs from the first end for an axial length and terminates short of the distal positioning tip.

17. The anchor of claim 16, wherein the internal bore includes a first bore section running from the driving end toward the distal positioning tip and a second bore section running from the first bore section toward the distal positioning tip, wherein the second bore section has a smaller size in axial end view than the first bore section, such that a fastener threaded into the bore causes and end section of the anchor body to split when the fastener pushes radially outwardly on inner wall portions of the second bore section.

18. The anchor of claim 16, wherein each slot extends onto at least a portion of the distal positioning tip.

19. An anchor for wallboard installation, comprising:
an elongated anchor body including a driving end and a wall boring end;
wherein the anchor body has a main body portion running from the driving end toward the wall boring end;
wherein a wall seating flange extends radially outward from a rearward end of the main body portion, wherein the main body portion includes a thread that runs from a location along a length of the main body portion and toward the wall seating flange;

wherein the wall boring end includes a plurality of cutting teeth;

wherein a pair of diametrically opposed recesses are formed in the main body portion, wherein a pair of diametrically opposed slots are provided in the anchor body, wherein each slot includes a first end that begins in one of the recesses, wherein each slot extends toward a distal tip of the wall boring end;

wherein the anchor body includes an internal bore running from the driving end toward a distal tip of the wall boring end, wherein the internal bore terminates short of the distal tip, wherein each slot is a through slot to the internal bore, wherein each slot runs from the first end for an axial length and terminates short of the distal positioning tip, wherein each recess has a curved perimeter shape for stress relief, wherein each recess defines a reduced thickness wall portion of the anchor body as compared to wall portions surrounding the recesses;

wherein the internal bore includes a first bore section running from the driving end toward the distal tip and a second bore section running from the first bore section toward the distal tip, wherein the second bore section has a smaller size in axial end view than the first bore section, such that a fastener threaded into the bore causes and end section of the anchor body to split when the fastener pushes radially outwardly on inner wall portions of the second bore section.

\* \* \* \* \*